United States Patent
Di Censo et al.

(10) Patent No.: US 9,622,013 B2
(45) Date of Patent: Apr. 11, 2017

(54) DIRECTIONAL SOUND MODIFICATION

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 62 days.

(21) Appl. No.: 14/563,458

(22) Filed: Dec. 8, 2014

(65) Prior Publication Data

US 2016/0165336 A1 Jun. 9, 2016

(51) Int. Cl.
*H04R 1/32* (2006.01)
*H04R 3/12* (2006.01)
*H04S 7/00* (2006.01)
*H04R 3/00* (2006.01)

(52) U.S. Cl.
CPC ............ *H04S 7/304* (2013.01); *H04R 3/005* (2013.01); *H04R 2499/13* (2013.01); *H04S 2400/11* (2013.01)

(58) Field of Classification Search
CPC . H04R 1/32; H04R 3/12; H04R 25/40; H04R 25/407
See application file for complete search history.

(56) References Cited

U.S. PATENT DOCUMENTS

| | | | |
|---|---|---|---|
| 2005/0117771 A1 | 6/2005 | Vosburgh et al. | |
| 2010/0302033 A1 | 12/2010 | Devenyi et al. | |
| 2012/0121103 A1* | 5/2012 | Cohen | H04R 1/1083 381/77 |
| 2012/0215519 A1* | 8/2012 | Park | G06F 17/289 704/2 |
| 2013/0083938 A1* | 4/2013 | Bakalos | G10K 11/1788 381/71.8 |
| 2013/0275873 A1* | 10/2013 | Shaw | G01S 3/8006 715/716 |
| 2014/0029767 A1 | 1/2014 | Jarvinen et al. | |

(Continued)

FOREIGN PATENT DOCUMENTS

WO 2011063857 A1 6/2011

OTHER PUBLICATIONS

Basu et al., "Smart Headphones", Proceedings of CHI 2001 Extended Abstracts on Human Factors in Computing Systems, pp. 267-268, Seattle WA.

(Continued)

*Primary Examiner* — Brenda Bernardi
(74) *Attorney, Agent, or Firm* — Artegis Law Group, LLP

(57) ABSTRACT

A sound modification system is disclosed that includes one or more audio sensors coupled with a processing device and arranged to detect sounds within an environment, and one or more audio output devices coupled with the processing device. The processing device operates to generate an audio signal based on sounds detected from within one or more selected directions for sound modification within the environment, and to output the generated audio signal using the one or more audio output devices. The output generated audio signal combines with the detected sounds to produce a desired sound modification.

20 Claims, 5 Drawing Sheets

(56) References Cited

U.S. PATENT DOCUMENTS

2014/0086423 A1* 3/2014 Domingo Yaguez .. H04R 3/005
381/58

OTHER PUBLICATIONS

Mueller et al., "Transparent Hearing", Proceedings of CHI 2002 Extended Abstracts on Human Factors in Computer Systems, pp. 730-731, Minneapolis, MN.

U.S. Appl. No. 14/106,369 entitled "Name-Sensitive Listening Device", filed Dec. 13, 2013.

U.S. Appl. No. 14/059,359 entitled "Modifying an Audio Panorama to Indicate the Presence of Danger or Other Events of Interest", filed Oct. 21, 2013.

U.S. Appl. No. 14/148,689 entitled "System and Method for User Controllable Auditory Environment Customization", filed Jan. 6, 2014.

Extended European Search Report Application No. 15-19 8443.2, dated Mar. 9, 2016, 8 pages.

* cited by examiner

DIRECTIONAL SOUND MODIFICATION

BACKGROUND

Field of the Disclosure

Embodiments disclosed herein relate to sound modification, and in particular, generating audio signals to produce desired sound modification for one or more selected directions within an environment.

Description of the Related Art

Individuals conventionally wear noise-cancelling or noise-attenuating headphones in busy or noisy environments in order to work without distraction. Common types of headphones include in-ear headphones (or "ear buds"), on-ear headphones, and over-the-ear headphones. In many cases, the headphones generally provide a degree of passive noise attenuation merely by being disposed over the ear canal of the wearer. Additionally, some headphones can provide active noise attenuation by generating sound waves that oppose sounds from the environment that are sensed by the headphones. Such headphones are typically configured to attenuate environmental noises falling within all or a selected portion of the audible frequency spectrum.

SUMMARY

In one embodiment, a sound modification system is disclosed that includes one or more audio sensors arranged to detect sounds within an environment and one or more audio output devices. The sound modification system further includes a processing device coupled with the audio sensors and audio output devices, wherein the processing device operates to generate an audio signal based on sounds detected from within one or more selected directions within the environment, and to output the generated audio signal using the one or more audio output devices.

In another embodiment, a method for directional sound modification is disclosed that includes selecting one or more directions within an environment to perform sound modification and detecting sounds from within the one or more selected directions using one or more audio sensors coupled with a processing device. The method further includes using the processing device to generate an audio signal based on the detected sounds, and outputting the generated audio signal using one or more audio output devices coupled with the processing device. The output generated audio signal combines with the detected sounds to produce a desired sound modification.

In another embodiment, a computer program product for directional sound modification is disclosed. The computer program product includes a computer-readable device having computer-readable program code embodied therewith, where the computer-readable program code configured to select one or more directions within an environment to perform sound modification, to detect sounds from within the one or more selected directions using one or more audio sensors coupled with a processing device, to generate, using the processing device, an audio signal based on the detected sounds, and to output the generated audio signal using one or more audio output devices coupled with the processing device. The output generated audio signal combines with the detected sounds to produce a desired sound modification.

Other systems, methods, features, and advantages of the disclosure will be, or will become, apparent to one of skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skill in the art that the present disclosure may be practiced without one or more of these specific details.

Embodiments disclosed herein include a sound modification system that includes one or more audio sensors arranged to detect sounds within an environment and one or more audio output devices. The sound modification system further includes a processing device coupled with the audio sensors and audio output devices, wherein the processing devices operates to generate an audio signal based on sounds detected from within one or more selected directions within the environment, and to output the generated audio signal using the one or more audio output devices. The output generated audio signal combines with the detected sounds to produce a desired sound modification.

The sound modification system may be implemented in various forms of audio-based systems, such as personal headphones, home stereo systems, car stereo systems, etc. The sound modification system may selectively provide noise attenuation, amplification, or any other desired audio effects for modifying detected sounds. The sound modification system may perform its processing functions using a dedicated processing device and/or a separate computing device such as a user's mobile computing device. The sound modification system may detect sounds from the environment using any number of audio sensors, which may be attached to or integrated with other system components or disposed separately. The detected sounds and selected directions may be used to generate a two-dimensional (2D) or three-dimensional (3D) map of the environment, and the processing device may update the map based on changes to user orientation, as well as changes in relative distance between a user and various noise sources.

Figure 1A:
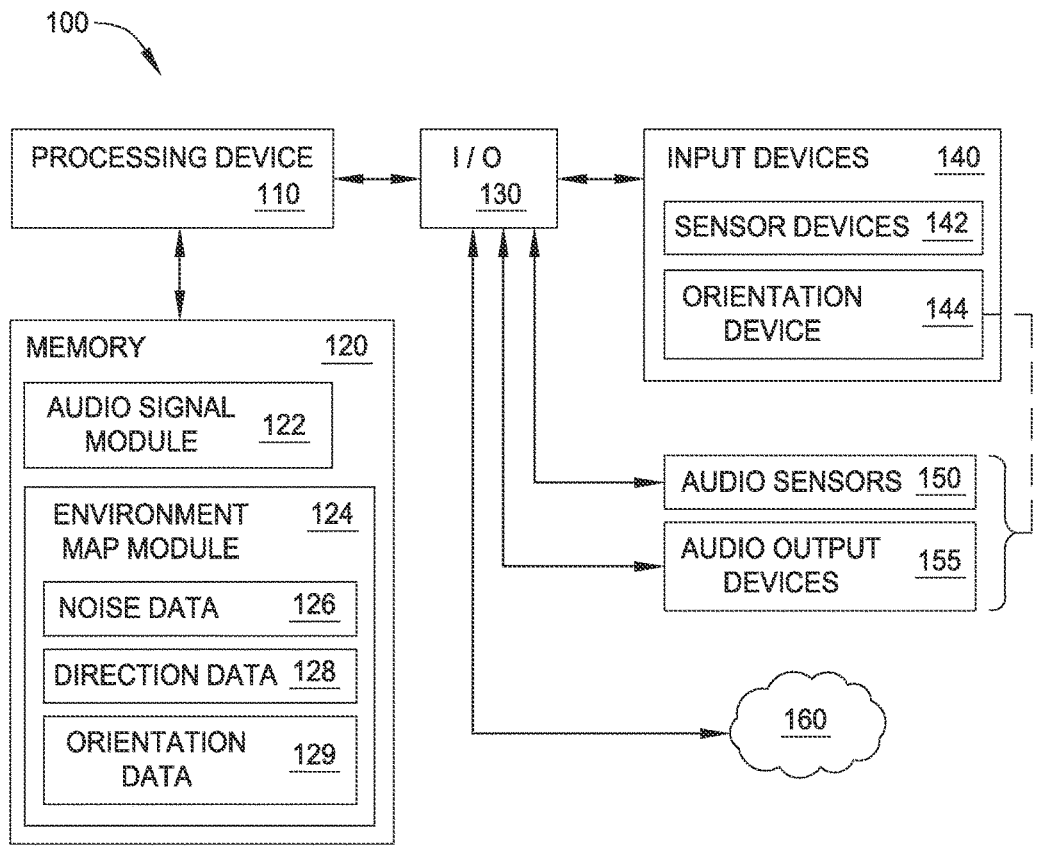
FIGS. 1A and 1B illustrate sound modification systems, according to various embodiments.
Figure 1B:
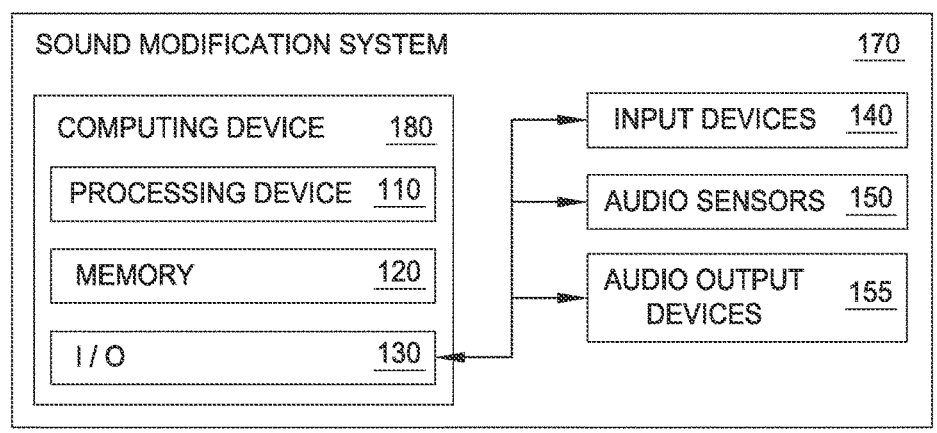

FIGS. 1A and 1B illustrate sound modification systems, according to various embodiments. As shown, sound modification system 100 includes a processing device 110, memory 120, input/output (I/O) 130, input device 140, audio sensors 150, and audio output devices 155. The processing device 110 may include any processing element capable of performing the functions described herein. While depicted as a single element within sound modification system 100, processing device 110 is intended to represent a single processor, multiple processors, a processor or processors having multiple cores, as well as combinations thereof. Memory 120 may include a variety of computer readable media selected for their size, relative performance, or other capabilities: volatile and/or non-volatile media, removable and/or non-removable media, etc. Memory 120 may include cache, random access memory (RAM), storage, etc. Memory 120 may include one or more discrete memory modules, such as dynamic RAM (DRAM) dual inline memory modules (DIMMs). Of course, various memory chips, bandwidths, and form factors may alternately be selected. Storage included as part of memory 120 may typically provide a non-volatile memory for the sound modification system 100, and may include one or more different storage elements such as Flash memory, a hard disk drive, a solid state drive, an optical storage device, and/or a magnetic storage device.

Memory 120 may include one or more modules for performing functions described herein. As shown, memory 120 includes an audio signal module 122 for generating audio signals to provide desired sound modifications for various selected directions, and an environmental map module 124 for creating a 2-dimensional (2D) or 3-dimensional (3D) mapping of noise sources within the environment. Audio signal module 122 may generally produce audio signals in the form of a scaled and possibly inverted copy of detected sounds, but may also generate other waveforms in order to produce the desired sound modification. For example, the audio signal module 122 might generate periodic audio signals or even random noise. The environmental map module 124 may separately include noise data 126 that reflects input from audio sensors 150, direction data 128 that reflects directions for sound modification (whether originally selected directions or updated) within the environment, and orientation data 129 that reflects the relative orientation of at least one of the audio sensors 150, audio output devices 155, and a user of the sound modification system 100.

The processing device 110 may communicate with other devices, such as peripheral devices or other networked computing devices, using input/output (I/O) 130. I/O 130 may include any number of different I/O adapters or interfaces used to provide the functions described herein. I/O 130 may include wired and/or wireless connections, and may use various formats or protocols. In one example, the processing device 110 through I/O 130 may determine selected directions for sound modification using input devices 140 that are connected using a wireless connection, such as Bluetooth® (a registered trademark of the Bluetooth Special Interest Group) or Wi-Fi® (a registered trademark of the Wi-Fi Alliance), may detect environmental sounds using audio sensors 150 over wired connections, and may provide appropriate audio signals to audio output devices 155 over a separate wired or wireless connection to produce a desired sound modification for the detected sounds in the selected directions.

I/O 130 may also include network interfaces that couple the processing device 110 to one or more networked computing devices through a network 160. Examples of networked computing devices include a server, a desktop computer, a mobile computing device such as a smartphone or tablet computer, and a worn device such as a watch or headphones or a head-mounted display device. Of course, other types of computing devices may also be networked with processing device 110. Network 160 may include one or more networks of various types, including a local area or local access network (LAN), a general wide area network (WAN), and/or a public network (e.g., the Internet). In some embodiments, the networked computing devices may be used as input devices 140, audio sensors 150, and/or audio output devices 155.

Input devices 140 are coupled with the processing device 110 and provide various inputs to the processing device 110 for performing directional sound modification. As shown, input devices 140 include sensor devices 142 and an orientation device 144. Sensor devices 142 may be provided to capture input from users of the sound modification system 100, and may include one or more types of sensors. For example, a user's input to select directions for sound modification may include gestures, such as various movements or orientations of the hands, arms, eyes, or other parts of the body. To detect user's input, sensor devices 142 may include visual sensors such as infrared (IR) sensors, thermal sensors, and/or imaging devices such as a charge-coupled device (CCD) or complementary metal-oxide-semiconductor (CMOS) sensor device. Sensor devices 142 may also include inertial sensors, such as a gyroscope or accelerometer. Sensor devices 142 may be worn or carried by the user, or may be disposed separately (i.e., existing as, or included with, a separate device). Of course, other types of sensor devices may also be included in sensor devices 142 to perform the various functions of receiving user input, which may include capacitive sensors, infrared sensors, magnetic sensors, sonar sensors, radar sensors, lidar sensors, neural sensors, and so forth.

In some embodiments, input devices 140 may include a user interface to receive user selection of directions for sound modification. The user interface may take any feasible form for providing the functions described herein, such as one or more buttons, toggles, sliders, dials, knobs, etc., or as a graphical user interface (GUI). The GUI may be provided through any component of the sound modification system 100. In one embodiment, the GUI may be provided by a separate computing device that is communicatively coupled with the processing device 110, such as through an application running on a user's mobile or wearable computing device. To provide preferential selection of sound modification, the user interface may allow user input for various parameters such as direction(s), type, and amount of sound modification to be performed. The parameters may be updated by the user or may be automatically updated during operation.

In another example, the user interface may receive verbal commands for selecting directions and other sound modification parameters. In this case, input devices 140 may include one or more audio sensors, which may be different or the same as the audio sensors 150. The processing device 110 may perform speech recognition on the received verbal commands and/or compare the verbal commands against commands stored in memory 120. After verifying the received verbal commands, the processing device 110 may carry out the commanded function for the sound modification system (for example, altering sound modification parameters to specified levels).

Orientation device 144 provides information about the orientation of the audio sensors, audio output devices, and/or a user relative to the environment (and more specifically, relative to noise sources within the environment). The orientation device may provide two-dimensional (2D) or three-dimensional (3D) orientation data to the processing device 110, which may integrate the orientation data into maps of the noise environment. Orientation device 144 may include one or more sensor devices capable of detecting user orientation, such as a magnetometer, gyroscope, accelerometer, or imaging device. Orientation device 144 may be worn by the user or may be disposed separately.

Audio sensors 150 are included to capture sounds occurring in the environment. The captured sounds may be used by the processing device to generate appropriate directional sound modification. The audio sensors may be a plurality of microphones or other transducers or sensors capable of converting sound waves into an electrical signal. The audio sensors may include an array of sensors that includes sensors of a single type, or a variety of different sensors. Audio sensors 150 may be worn by a user, or disposed separately at a fixed location or movable. The audio sensors may be disposed in any feasible manner in the environment. In several embodiments, the audio sensors 150 are generally oriented outward relative to audio output devices 155, which are generally disposed inward of the audio sensors 150 and also oriented inward. Such an orientation may be particularly beneficial for isolating one or more regions for which sound modification is to be performed (i.e., using output from the audio output devices 155) from the rest of the environment. In one example, the audio sensors 150 may be oriented radially outward from a user, while the audio output devices 155 are oriented radially inward toward the user.

Audio output devices 155 are included to output generated audio signals to provide appropriate sound modification corresponding to one or more selected directions within the environment. Of course, the sound modification audio signals may be simultaneously driven on the audio output devices 155 with other audio signals (e.g., music or other audio playback). The audio output devices may use conventional audio output techniques, such as loudspeakers or other suitable electroacoustic devices. Audio output devices 155 may be implemented using any number of different conventional form factors, such as discrete loudspeaker devices, around-the-ear (circumaural), on-ear (supraaural), or in-ear headphones, hearing aids, wired or wireless headsets, body-worn (head, shoulder, arm, etc.) listening devices, body-worn close-range directional speakers or speaker arrays, body-worn ultrasonic speaker arrays, and so forth. The audio output devices 155 may be worn by a user or disposed separately at a fixed location or movable. As discussed above, the audio output devices 155 may be disposed inward of the audio sensors 150 and oriented inward toward a particular region or user.

FIG. 1A shows one embodiment in which various components of the sound modification system 100 may be distributed across several devices. FIG. 1B shows another embodiment in which computing components (i.e., processing device 110, memory 120, and I/O 130) of sound modification system 170 are included in a discrete computing device 180. Generally, the computing device 180 receives input from the one or more input devices 140 and audio sensors 150, generates the audio signals for directional sound modification, and outputs the generated audio signals using audio output devices 155. As will be seen below, computing device 180 may be disposed in relative proximity to the audio sensors 150 and audio output devices 155.

Figure 2A:
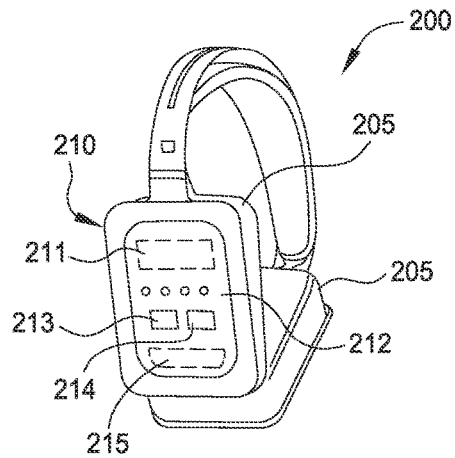
FIGS. 2A-2F illustrate sound modification systems deployed within different environments, according to various embodiments.

FIGS. 2A-2F illustrate sound modification systems deployed within different environments, according to various embodiments. FIG. 2A illustrates the sound modification system implemented in over-the-ear headphones 200, according to one embodiment. The headphones 200 include ear cups 205 that are provided to comfortably interface with a user's head and to cover the user's ears. The headphones 200 also include a housing 210 that connects to each ear cup 205, providing support to the ear cups, the speaker elements, as well as any other components included in the headphones 200. As shown, the headphones 200 include a processing module 211, a plurality of microphones 212, one or more buttons 213, a feedback device 214, and a power source 215. Of course, the person of ordinary skill in the art will recognize that other components, though not explicitly mentioned here, may also be included in headphones 200.

At a minimum, processing module 211 includes ability to receive audio signals through a wired or a wireless connection and to output the audio signal to the speaker elements of the headphones 200. Processing module 211 may also include one or more active or passive devices for modulating the received audio signals. Processing module 211 may include the processing device 110 along with other functionality described above with respect to the sound modification systems 100, 170 (e.g., sensor devices 142, orientation device 144) to provide directional sound modification within the environment. In one embodiment, the processing module 211 may be the computing device 180. Additionally, processing module 211 may be coupled with one or more separate computing devices that provide the sound modification audio signals, and optionally provide media to be output to the speaker elements of the headphones 200. The computing device may be a mobile or worn computing device of the user, such as a laptop, smartphone, tablet, smartwatch, etc.

The microphones 212 may be used as the audio sensors 150 and preferentially disposed in a particular arrangement. For example, an array of microphones 212 may be distributed along the width of the housing 210 and oriented outward to capture noise occurring in the environment outside the worn headphones. In one example, the microphones may be oriented radially outward, by following a curved outer surface of the housing 210 and/or by being individually oriented. Of course, the microphones may be preferentially distributed along one or more dimensions or surfaces to provide a sound-capturing panorama of a desired shape and size. In one embodiment, the array of microphones may include one or more microelectromechanical systems (MEMS) devices, each MEMS device including a plurality of smaller transducers. The plurality of transducers may be spatially separated so that the directionality of the sound events can be determined through arrival timing differences. The signals received from the transducers may then be processed and examined for intensity, spectral, and timing cues to allow localization of sound sources.

The one or more buttons 213 may be used as an input device 140 for selecting one or more directions within the environment for performing sound modification. The buttons 213 may be disposed on the housing 210, such as one or more buttons on the portions of housing 210 connected to each ear cup 205. The buttons 213 may be disposed similarly to the microphones 212 with each button corresponding specifically to one or more of the microphones 212. In one embodiment, the buttons and microphones correspond in a 1:1 ratio. For example, pressing a button may toggle whether or not sound modification is being performed on the sounds detected by the corresponding one or more microphones, or may change sound modification settings (e.g., change the amount of amplification or attenuation). In one embodiment, the buttons 213 may be provided to cycle through a plurality of predetermined settings for sound modification, whether set by default or user-specified. In one embodiment, the buttons 213 may be used as a trigger device for other inputs. For example, the user may press a button and subsequently input a verbal command or make a particular input gesture to select directions or other sound modification parameters.

Feedback device 214 may be included to provide visual or haptic feedback to a user. For example, feedback device 214 may include one or more light emitting diodes (LEDs) or vibrating motors. In one embodiment, the LEDs may be disposed similarly to the microphones 212 and/or buttons 213, and may indicate the selected directions for performing sound modification. The feedback device may also acknowledge a successful user selection, e.g., by blinking or vibrating.

Power source 215 may be coupled with the processing module 211 and feedback device 214 to provide power to each component. Power source 215 may include replaceable or rechargeable batteries or other energy storage devices. Power source 215 may also include a connection to wall power for powering the components and/or recharging the batteries.

Figure 2B:
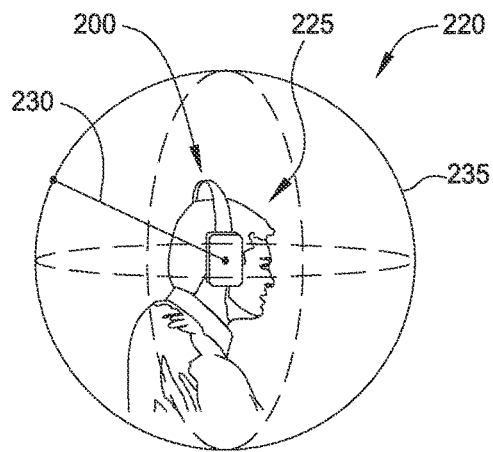

FIG. 2B illustrates an example environment 220, in which the over-the-ear headphones 200 are worn by a user 225, according to one embodiment. Based on intrinsic properties of the microphones and their relative dispositions within headphones 200, the various microphones are each capable of sensing a minimum threshold level of sound, which may correspond to a particular distance 230 from the microphone. In combination, the composite sensing regions of the various microphones may form an audio sensing zone 235, which is represented by a spatial area or volume extending from the microphones into the ambient environment. The audio sensing zone 235 may have various shapes and/or sizes depending on the number, positioning, and orientation of the microphones, as well as each microphone's capability (e.g., sensitivity, frequency response, etc.). In the simplified example depicted here, audio sensing zone 235 is represented by a sphere surrounding the head of user 225. Of course, more complex shapes are possible and expected, such as elongated shapes, shapes that include overlapping areas of microphone coverage, or non-continuous shapes in which the microphones do not provide complete sound coverage. For any given device, such as headphones 200, the device may have differing audio sensing zones at different noise frequencies as the frequency-dependent properties of each microphone may be different.

As described here, the outer spatial limits of the audio sensing zone represent some predetermined minimum sound level (e.g., 3 decibels or dB). Of course, this does not require that a particular noise source be physically located within the space defined by the audio sensing zone, but only that the noise source generates sufficient power to meet or exceed the threshold sound level at the outer limit.

Figure 2C:
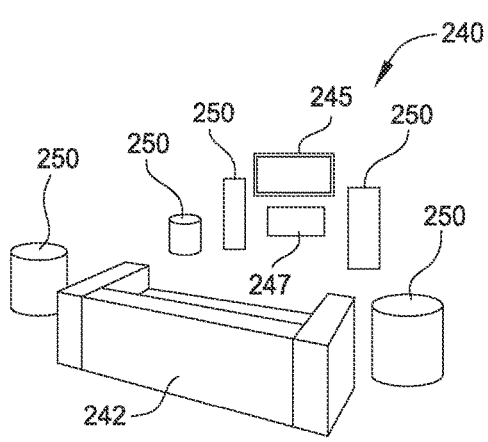

FIG. 2C illustrates another example environment 240 for a sound modification system, according to one embodiment. In this case, the sound modification system may be deployed in a home stereo system. The home stereo system may include a television 245 or other audiovisual device, a stereo receiver 247, and a plurality of speakers 250. Each of the speakers 250 may include drivers corresponding to different frequency ranges (e.g., tweeters, woofers, subwoofers) and may be preferentially disposed within the environment 240 for audio quality. More specifically, the television 245 and speakers 250 may be disposed to provide optimal audio and video quality for one or more users at a predetermined location, e.g., seated on couch 242.

Figure 2D:
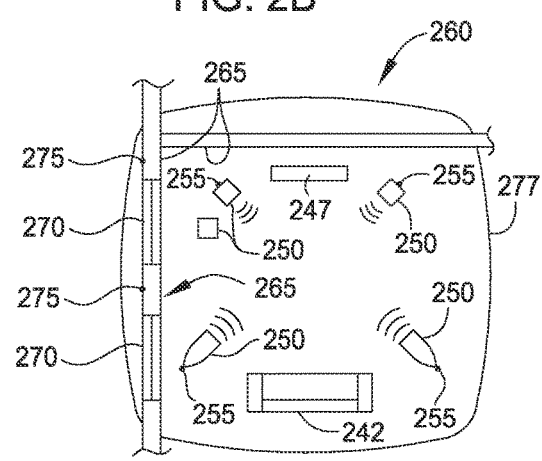

FIG. 2D illustrates a top view of environment 260, according to one embodiment. In large part, the environment 260 is the same as environment 240, but environment 260 explicitly depicts audio sensors and the corresponding audio sensing zone 277. One or more different types of audio sensors may be included in the environment 260. The audio sensors may be attached to, or integrated with, various components of the home stereo system, such as audio sensors 255 disposed on the speakers 250. Audio sensors may also be disposed separately, such as attached to a non-component of the home stereo system, or as a stand-alone sensor. Audio sensors 275 are attached to the exterior of walls 265 near windows 270, and may be used to modify outdoor noise (e.g., animals, neighbors, automotive/train/air traffic, etc.). Processing for the sound modification system may be natively performed by the stereo receiver 247, or may be performed by a separate computing device which is also able to output audio signals to the various speakers 250. The computing device could be a computing system included with the home stereo system, or alternately may be a mobile computing device of the user, such as a laptop, smartphone, tablet, smartwatch, etc.

Figure 2E:
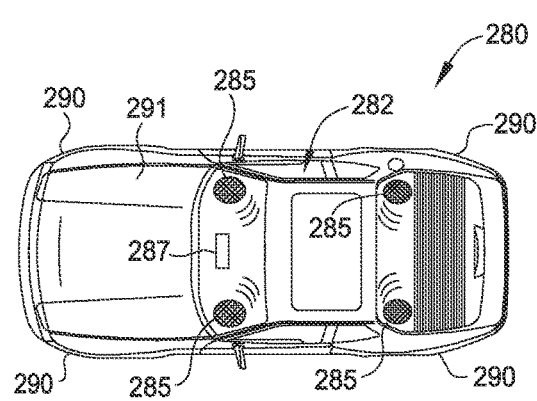

FIG. 2E illustrates a sound modification system as implemented in an automobile 280, according to one embodiment. As shown, automobile 280 includes a passenger compartment 282, in which a plurality of speakers 285 and an audio receiver 287 are located. The audio receiver 287 is coupled with the speakers 285 and generally operates to receive an audio input (AM/FM/satellite-based radio, compact disc, MP3 files, etc.) and to drive amplified and/or equalized audio signals to the speakers 285. The sound modification system may include a plurality of audio sensors 290 disposed on the exterior of the automobile 280 and oriented outward. Though four audio sensors are shown as disposed on the automobile's quarter panels, any number of sensors disposed in any interior or exterior location of the automobile are possible. In one embodiment, audio sensors may be disposed near the engine compartment 291 (such as between the engine compartment and the passenger compartment 282) in order to preferentially modify engine sounds (e.g., attenuate or amplify). Processing for the sound modification system may be natively performed by the audio receiver 287, or may be performed by a separate computing device which is also able to output audio signals to the various speakers 285. Again, the computing device could be a computing system included with the audio system, or alternately may be a mobile computing device of the user, such as a laptop, smartphone, tablet, smartwatch, etc.

Figure 2F:
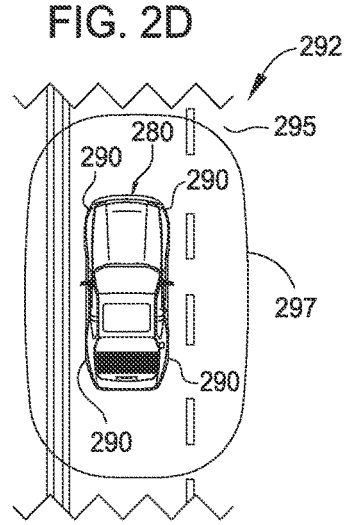

FIG. 2F illustrates environment 292, in which the automobile 280 is operating along road 295. As with other embodiments described above, the sensors 290 of the sound modification system correspond to an audio sensing zone 297. As environmental noises are detected by sensors 290, the sound modification system may generate audio signals to provide the desired modification effect for sounds coming from selected directions.

Figure 3:
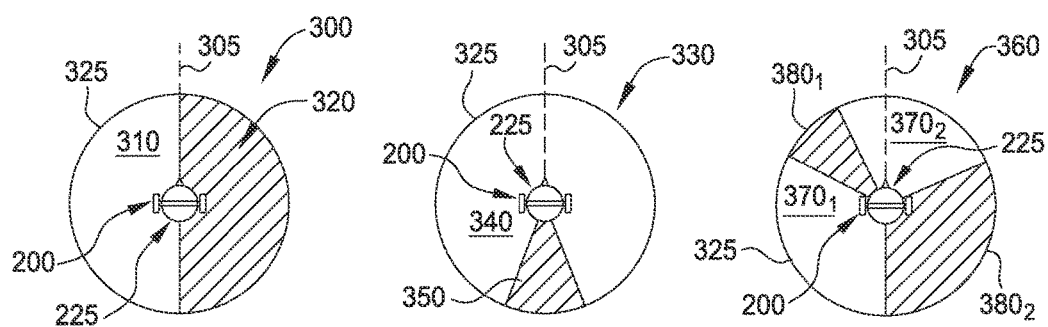
FIG. 3 illustrates selection of directions for sound modification within an environment, according to one embodiment.

FIG. 3 illustrates the selection of directions for sound modification within an environment, according to one embodiment. Although one particular embodiment including headphones is depicted, the person of ordinary skill will understand that various alternative implementations are also possible. Environment 300 provides a top-down depiction of a user 225 wearing headphones 200 on his or her head. The user 225 has an initial orientation 305 within the environment 300. Though a simplified 2D representation of the user orientation and the environment is presented here, the person of ordinary skill will understand that the same principles would also apply to a 3D representation (e.g., capturing whether the user is leaning head forward, back, to the left or right side, etc.). An audio sensing zone 325 representing the composite sensing regions of the various microphones included with the headphones 200 extends from the microphones into the ambient environment. Sounds detected by headphones 200 as coming from pass-through area 310 within the audio sensing zone 325 are permitted to pass through to the user without applying an active sound modification. Sounds detected as coming from modification area 320 within the audio sensing zone 325, however, are combined with generated audio signals to produce a desired sound modification.

A user may select the direction(s) for sound modification using any number of methods. In the simplified case shown in environment 300, the user might select an entire side 320 to be attenuated or amplified (i.e., corresponding to one of the ear cups of the headphones 200). Alternatively, the user might specify an angle and angular width (say a center angle of 90° from the current orientation 305, with a 180° width), or multiple angles (from 0°-180°).

As discussed above, the user may be able to provide this direction selection input through the use of pushbuttons, verbal commands, gestures, using a GUI, etc. In one embodiment, each side of headphones 200 may include one or more buttons, so that user 225 may selectively apply sound modification for one or more directions merely by pressing corresponding buttons. In another embodiment, the user may provide verbal commands for selecting the one or more directions, by selecting the angles directly or indirectly (e.g., using words or phrases that are pre-mapped to certain angles). In another embodiment, the user may provide gestures in which the angles may be selected directly or indirectly. For example, a user could point to first and second angles defining the modification area 320, or could point at an object (e.g., a particular noise source). In one embodiment, the orientation of the user's eyes may be determined in conjunction with selecting the one or more directions, so that by simply looking at a sound source the direction may be determined In this case, the direction may be determined based on the user's gaze after triggering the selection by speaking a verbal command, pressing a button, etc. The sound modification system may receive the user's input and set appropriate angles so that the object is completely included within modification area 320.

Along with selecting directions for sound modification, the user 225 may also specify the type and amount of modification (e.g., amplification, attenuation, and amounts of either). For example, a user might point to a noise source and say, "reduce this noise by 50%" or "reduce any noises from this direction by 3 dB." In another example, a user wearing headphones who wants to be made aware when a coworker approaches his or her office might point to the open office door and say, "increase sounds coming from this direction by 35%." The type and amount of sound modification may vary for different modification areas. In addition to directions, a user may also specify that certain frequency ranges are to be modified. The user may specify these by indicating specific frequency values or by selecting pre-mapped frequency ranges (corresponding to speech, automobile traffic, or other common noise source ranges). The modification areas specified by the user (such as modification area 320) may track the user's orientation, or may remain fixed despite changes to the user's orientation. For example, the user may select all sounds from his or her right side to be sound modified. If the corresponding modification area is set to track the user, the sounds coming from the user's right side at any instant (even if the user has moved) will continue to be sound modified.

In some embodiments, input from one or more sensors may be correlated with various sound sources to determine which sounds are most disruptive for a user. The disruption determination may be based on a temporal comparison of sensor measurements against various sounds in the environment. Example sensor measurements include brain activity to determine a loss of focus or concentration (e.g., using neural sensors) or detecting eye or head movement (e.g., a larger movement may generally correlate to a disruption). Based on the disruption determination, when audio sensors detect sounds that meet criteria sufficiently similar to the disruptive sounds, directions for sound modification may be determined and applied automatically for these sounds.

As discussed above, the sound modification systems may generate mappings of the environment to reflect detected noise and the one or more selected directions for sound modification. The sound modification systems may transform the mappings according to the user's current location and orientation before generating the audio signals for sound modification. A 2D version of the map may be similar in appearance to the depictions of FIG. 3. Whereas the modification areas of the 2D map are generally represented as wedges projecting from the user (or from one or more microphones), a 3D map might include various vectors projecting from the user or microphones, which in 3D space might be conical or appear cone-like.

As a part of generating the environmental maps, the sound modification systems may also estimate discrete noise source locations for the detected sounds, and may plot those estimated locations in the maps. The maps may use any known coordinate systems, such as Cartesian, polar, or spherical coordinates. These maps may further be linked to an absolute position of the user (provided via sensor devices, such as a Global Positioning System (GPS) sensor). When linked to an absolute position, the maps may be useful for other users of sound modification systems. For example, noise maps that are generated while a headphone-wearing user walks down a busy road could be stored to a server and later provided to other users in that vicinity, which might decrease or prevent redundant processing by the various sound modification systems.

Environment 330 also provides a top-down depiction of the user 225 wearing headphones 200 on his or her head. User 225 has same orientation 305, but in this example wishes to specify different directions for the modification area 350 (in this case, the area is located behind the user). The user 225 setting one or more modification areas 350 may also operate to define one or more pass-through areas 340 within the audio sensing zone 325. Again, the user may select the directions by specifying particular angles. In an alternate embodiment, the user may specify a direction or particular angle, along with a modifier to describe the relative width of the modification area 350 (e.g., "narrow," "moderate," "wide"). The modifiers may be pre-mapped to represent certain angular widths. In an alternate embodiment, the user may specify one angle (e.g., 180 degrees from current orientation, or "behind me") and a predetermined default angular width is applied to create the modification area 350. Of course, after initially setting the modification area 350, the user may select entirely new modification areas or may make incremental adjustments to the modification area 350. For example, the user may identify the modification area and provide specific angle or angular width changes, or may specify widening/narrowing the modification area and/or shifting the modification area relative to user orientation.

Environment 360 also provides a top-down depiction of the user 225 wearing headphones 200 on his or her head. User 225 has same orientation 305, but in this example wishes to specify directions for two different modification areas $380_1$, $380_2$. Setting the modification areas $380_1$, $380_2$ may also operate to define one or more pass-through areas $370_1$, $370_2$ within the audio sensing zone 325. The user may specify angles or ranges of angles for each modification area $380_1$, $380_2$, which may be selected simultaneously or at different times. As before, user may alternately use verbal descriptors to set the width of each modification area (for example, "a wide range centered at 135°, and a narrow range at 315°"). Alternatively, the user may specify an angle, and a predetermined default angular width is applied.

Figure 4:
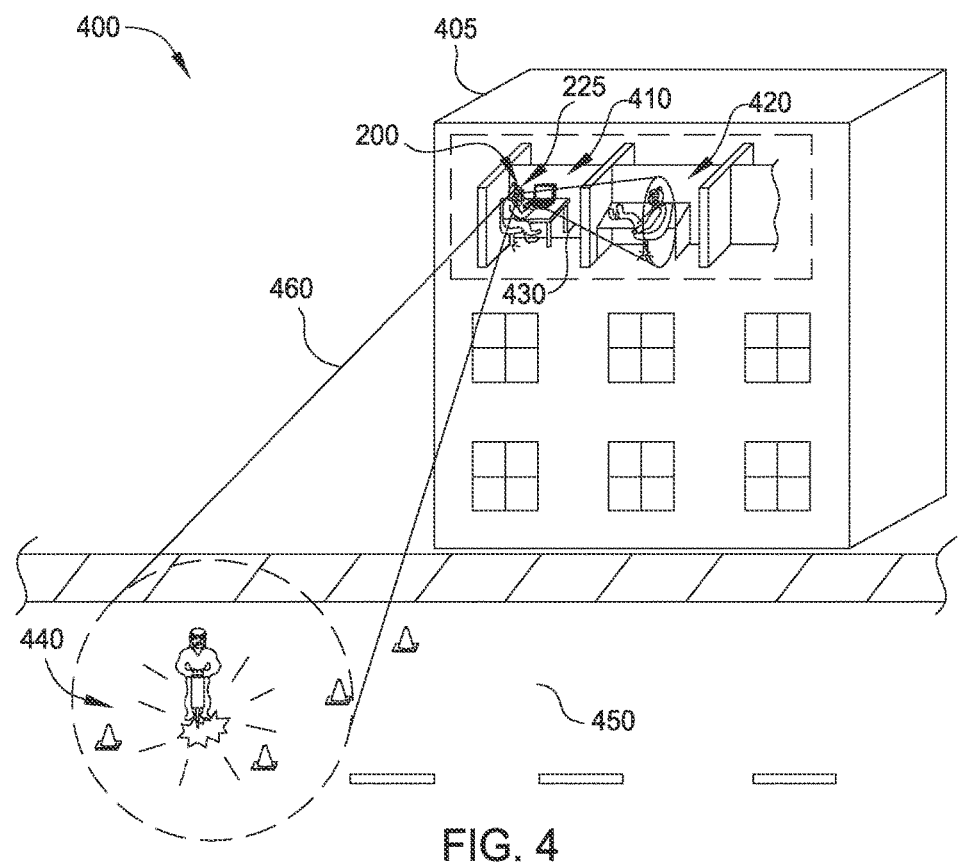
FIG. 4 illustrates operation of a sound modification system in a noisy environment, according to one embodiment.

FIG. 4 illustrates operation of a sound modification system deployed in a noisy environment, according to one embodiment. A multi-story office building 405 is depicted, in which user 225 is wearing headphones 200 while working at a workstation 410. A co-worker in an adjacent workstation 420 is talking loudly on a phone, which may be distracting to the user. Meanwhile, roadwork 440 is occurring on the street 450 outside the office building 405, also creating noise that may distract the user.

Using any of the various techniques described above, the user may select directions for noise modification corresponding to these noise sources. In this case, the user may desire to attenuate the noise sources. Although not shown, user may additionally or alternatively select one or more directions in which to enhance sound (e.g., amplify and/or equalize), such as from the directions of the user's computer or phone. After the user specifies the directions corresponding to the noise sources, the sound modification system may determine the loudest noise source(s) within a predetermined range of the specified directions, as the user may not have provided a precise indication of the directions, and as it is likely that the loudest noises coming from the selected directions are what the user seeks to modify. A 3D mapping of the environment 400 may thus include vectors 430 and 460 projecting from the user 225 (or rather, the corresponding microphones included in headphones 200). The vectors 430, 460 indicate that sound modification will be performed for sounds detected as coming from the corresponding directions.

Figure 5:
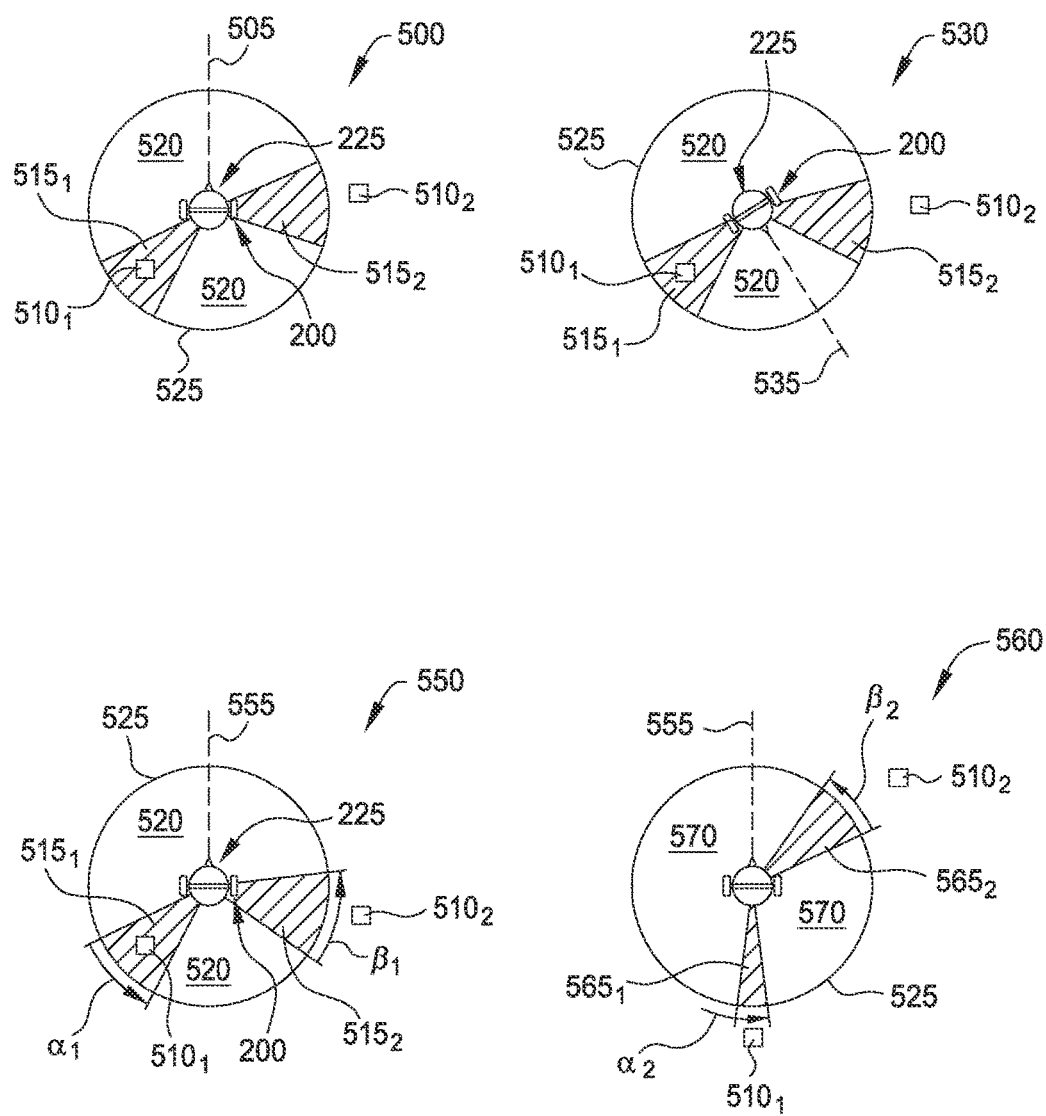
FIG. 5 illustrates updating selected directions for sound modification according to one embodiment.

FIG. 5 illustrates updating selected directions for sound modification, according to one embodiment. In environment 500, a user 225 is depicted as wearing headphones 200 on his or her head, while in an initial orientation 505. Two point noise sources $510_1$, $510_2$ are included in the environment 500. One noise source $510_1$ is disposed within the audio sensing zone 525 of the headphones 200, while the other noise source $510_2$ is disposed outside. Thus, sounds detected from directions corresponding to pass-through areas 520 are not sound-modified, while sounds from the modified areas $515_1$, $515_2$ are modified by the sound modification system. The sound modification system may generate a map of the environment 500 based on these selected directions and noise sources.

In environment 530, the user has turned his or her entire body (or perhaps just his/her head), such that orientation of the user (or of the audio sensors of headphones 200) changes from orientation 505 to orientation 535. In one embodiment, the sound modification system is configured to track the noise sources for changes in user orientation. Though the user has re-oriented, the noise sources $510_1$, $510_2$ remain in the same positions, and thus the modified areas $510_1$, $510_2$ remain static relative to the noise sources. No matter what changes to user orientation occur, the noise sources will continue to be sound modified. While the environments are shown in 2D for simplicity, the person of ordinary skill will understand that similar implementations may be made in 3D space.

In one embodiment, the sound modification system is configured to also track displacement of the user and/or the noise sources. This may be done in addition to tracking the noise sources for changes in user orientation. In environment 550, the user has an initial orientation 555. Again, two point noise sources $510_1$, $510_2$ are included. The modified area $515_1$ corresponding to noise source $510_1$ has an initial angular width $\alpha_1$, and modified area $515_2$ corresponding to noise source $510_2$ has an initial angular width $\beta_1$.

Figure 6:
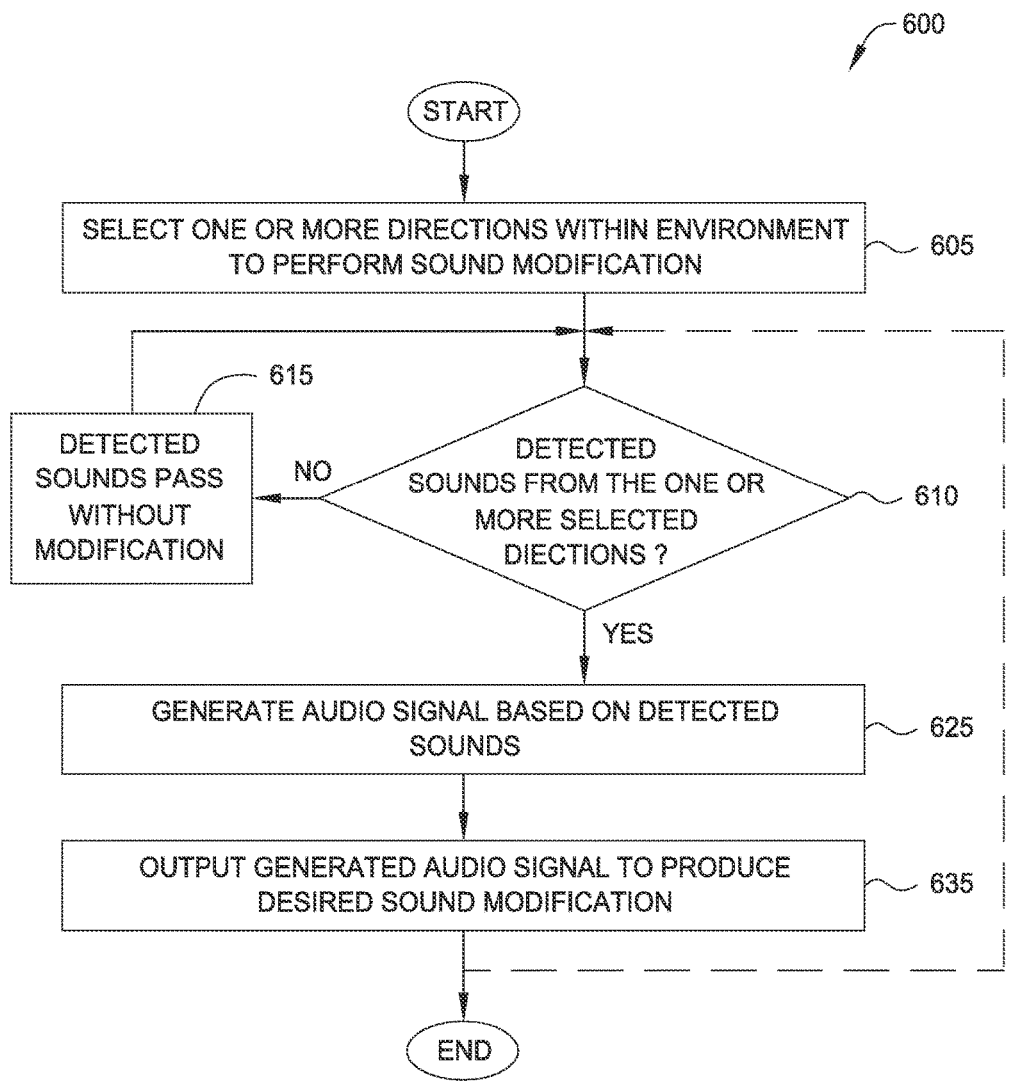
FIG. 6 illustrates a method for directional sound modification, according to one embodiment.

In environment 560, user maintains the same orientation 555 but a relative displacement occurs between the user and the two point noise sources $510_1$, $510_2$. For example, the user may be moving and/or one or both of the noise sources may be moving. Modification area $515_1$ has shifted relative to the user orientation and is now modification area $565_1$, and has a smaller angle $\alpha_2$ indicating an increase in distance between the user and the noise source $510_1$. Modification area $515_2$ has also shifted relative to the user orientation and is now modification area $565_2$, but has an angle $\beta_2$ that is approximately the same size as angle $\beta_1$ (indicating that the distance between the user and noise source is approximately the same). Corresponding pass-through areas 570 fill the remainder of the audio sensing zone 525, FIG. 6 illustrates a method for directional sound modification, according to one embodiment. The method 600 may be used consistent with descriptions of the various sound modification systems described above, and within the environments described in various embodiments. Method 600 may be performed using a processing device of a sound modification system, or using a separate computing device communicatively coupled with the sound modification system, or using a combination of various processing devices. For example, method 600 may be performed by an application executing on a user's mobile computing device communicatively coupled with the sound modification system.

Method 600 begins at block 605, where one or more directions within the environment are selected for performing sound modification. The directions may be selected by a user, as well as the type and amount of modification to perform on sounds coming from the selected directions. The selected directions may be included in a 2D or 3D map generated of the noise environment, and may form one or more modification areas that may selectively track user orientation, user displacement, and/or noise source displacement.

At block 610, the processing device determines whether sounds are detected as coming from the one or more selected directions by one or more audio sensors of the sound modification system. If no sounds are detected, or if any detected sounds are determined to come from pass-through areas falling outside the selected directions, the method proceeds to block 615 ("NO") and any detected sounds from the non-selected directions are permitted to pass through without providing active sound modification. The method may generally loop through block 610, whether continuously or at discrete time intervals, until detected sounds correspond to the one or more selected directions ("YES"), when the method proceeds to block 625.

At block 625, the processing device generates an audio signal based on the detected sounds corresponding to the one or more selected directions. The audio signal is also based on the desired sound modification specified by the user, such as attenuation or amplification of the detected sounds, and amounts of either. The audio signal may generally take the form of a scaled and possibly inverted copy of the detected sounds, but other waveforms may be used to generate the desired sound modification.

At block 635, the generated audio signal is output to produce the desired sound modification. This may include driving selected ones of the audio output devices with the output signal (for example, audio output devices whose orientations are most closely aligned with the selected directions). The method may end following block 635, or may return to block 610, whether as a continuous loop or at discrete time intervals.

The present disclosure may be embodied in an apparatus, a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A sound modification system, comprising:
a set of two or more audio sensors coupled with a processor and arranged to detect sounds within an environment;
one or more audio output devices coupled with the processor,
wherein the processor operates to:
detect sounds received from one or more selected directions within the environment;
generate an audio signal that comprises an inverted copy of the sounds received from the one or more selected directions, wherein the sounds received from the one or more selected directions are a subset of sounds detected within the environment; and
transmit the audio signal to the one or more audio output devices to generate audio output, wherein the audio output combines with the sounds received from the one or more selected directions to produce a desired sound modification.

2. The sound modification system of claim 1, wherein the desired sound modification is sound attenuation, and wherein the audio signal comprises a scaled, inverted copy of the sounds received from the one or more selected directions.

3. The sound modification system of claim 1, further comprising a first input device coupled with the processor and arranged to receive selection input from a user of the sound modification system.

4. The sound modification system of claim 3, wherein the user specifies the one or more selected directions through an interface provided by the first input device.

5. The sound modification system of claim 3, wherein the first input device comprises a sensor device arranged to detect at least one of gestures and verbal commands provided by the user.

6. The sound modification system of claim 1, further comprising an orientation device coupled with the processor and comprising a sensor device, wherein the orientation device operates to determine the orientation of at least one of:
the set of two or more audio sensors within the environment, and
the one or more audio output devices within the environment,
wherein the determined orientation is used to update the one or more selected directions.

7. The sound modification system of claim 1, wherein the processor further operates to generate a map of the environment that reflects the one or more selected directions.

8. The sound modification system of claim 7, wherein the generated map of the environment includes one or more identified sound sources, and wherein the processor is configured to update the map of the environment based on a relative motion of the set of two or more audio sensors and the one or more audio output devices, and the one or more identified sound sources.

9. A method for directional sound modification, comprising:
receiving direction input data from an input device coupled with a processor;
selecting, using the processor and based on the direction input, one or more directions within an environment to perform sound modification;
detecting sounds received from the one or more selected directions using a set of two or more audio sensors coupled with the processor;
generating, using the processor, an audio signal that comprises an inverted copy of the sounds received from the one or more selected directions, wherein the sounds received from the one or more selected directions are a subset of sounds detected within the environment; and
transmitting the audio signal to one or more audio output devices coupled with the processor to generate audio output, wherein the audio output combines with the sounds received from the one or more selected directions to produce a desired sound modification.

10. The method of claim 9, wherein the desired sound modification is sound attenuation, and wherein the audio signal comprises a scaled, inverted copy of the sounds received from the one or more selected directions.

11. The method of claim 9, further comprising receiving selection input from a user, wherein the selection input is used to determine the one or more selected directions.

12. The method of claim 11, wherein receiving selection input from a user comprises detecting at least one of gestures and verbal commands provided by the user.

13. The method of claim 9, further comprising:
receiving orientation data from an orientation device coupled with the processor;
determining, using the processor and based on the orientation data, the orientation of at least one of:
the set of two or more audio sensors within the environment, and
the one or more audio output devices within the environment; and
updating the one or more selected directions based on the determined orientation.

14. The method of claim 9, further comprising generating a map of the environment that reflects the one or more selected directions.

15. The method of claim 14, further comprising updating the map of the environment based on a motion of the set of two or more audio sensors or the one or more audio output devices, relative to one or more identified sound sources within the environment.

16. A non-transitory computer-readable storage medium storing instructions that, when executed by a processor, cause the processor to perform directional sound modification by performing the steps of:
selecting one or more directions within an environment to perform sound modification;
detecting sounds received from the one or more selected directions using a set of two or more audio sensors coupled with a processor;
generating, using the processor, an audio signal that comprises an inverted copy of the sounds received from the one or more selected directions, wherein the sounds received from the one or more selected directions are a subset of sounds detected within the environment; and transmitting the audio signal to one or more audio output devices coupled with the processor to generate audio output, wherein the audio output combines with the sounds received from the one or more selected directions to produce a desired sound modification.

17. The non-transitory computer-readable storage medium of claim 16, wherein the desired sound modification is sound attenuation, and wherein the audio signal comprises a scaled, inverted copy of the sounds received from the one or more selected directions.

18. The non-transitory computer-readable storage medium of claim 16, further comprising receiving selection input from a user that includes at least one of gestures and verbal commands provided by the user, wherein the selection input is used to determine the one or more selected directions.

19. The non-transitory computer-readable storage medium of claim 16, further comprising:
   determining the orientation of at least one of:
      the set of two or more audio sensors within the environment, and
      the one or more audio output devices within the environment; and
   updating the one or more selected directions for sound modification within the environment based on the orientation.

20. The non-transitory computer-readable storage medium of claim 16, further comprising:
   generating a map of the environment that reflects the one or more selected directions for sound modification; and
   updating the map of the environment based on a motion of the set of two or more audio sensors or the one or more audio output devices, relative to one or more identified sound sources within the environment.

* * * * *